United States Patent [19]

Bahder et al.

[11] 4,394,534
[45] Jul. 19, 1983

[54] CRYOGENIC CABLE AND METHOD OF MAKING SAME

[75] Inventors: George Bahder, Edison, N.J.; Mario Rabinowitz, Menlo Park, Calif.

[73] Assignee: Electric Power Research Institute, Inc., Palo Alto, Calif.

[21] Appl. No.: 111,808

[22] Filed: Jan. 14, 1980

[51] Int. Cl.³ .............................................. H01B 7/34
[52] U.S. Cl. ...................................... 174/15 S; 29/559; 174/126 S; 174/128 S; 174/29; 138/28
[58] Field of Search ................ 174/15 S, 15 C, 126 S, 174/128 S, 130, 13, 29, 27; 29/599; 335/216; 138/28, 113, 119, 149, 137

[56] References Cited

U.S. PATENT DOCUMENTS

| 1,989,914 | 2/1935 | Chase | 138/28 X |
|---|---|---|---|
| 2,189,090 | 2/1940 | Unterbusch | 174/29 |
| 3,332,446 | 7/1967 | Mann | 174/29 |
| 3,431,347 | 3/1969 | Kafka et al. | 174/15 S |
| 3,528,456 | 9/1970 | Scheffler | 138/113 |
| 3,529,071 | 9/1970 | Kafka | 174/15 S |
| 3,562,401 | 2/1971 | Long | 174/15 S |
| 3,565,118 | 2/1971 | Stearns | 174/15 S X |
| 3,592,238 | 7/1971 | Scheffler et al. | 174/29 X |
| 3,595,982 | 7/1971 | Kafka | 174/126 S X |
| 3,603,715 | 9/1971 | Eilhardt et al. | 174/29 X |
| 3,604,832 | 9/1971 | Köhler et al. | 174/15 S |
| 3,604,833 | 9/1971 | Beck | 174/29 X |
| 3,612,742 | 10/1971 | Snowden et al. | 174/15 S |
| 3,639,672 | 2/1972 | Kafka | 335/216 X |
| 3,643,002 | 2/1972 | Minnich | 335/216 X |
| 3,665,967 | 5/1972 | Kachnik | 138/137 |
| 3,715,452 | 2/1973 | Long | 174/15 S |
| 3,735,018 | 3/1973 | Griesinger | 174/15 C X |
| 3,743,760 | 7/1943 | Sassin | 174/15 S |
| 3,754,095 | 8/1973 | Aupoiy et al. | 335/216 X |
| 3,800,062 | 3/1974 | Kataska et al. | 174/15 S |
| 4,031,310 | 6/1977 | Jachimowicz | 174/15 C |
| 4,039,740 | 8/1977 | Iwata | 174/15 S |
| 4,056,679 | 11/1977 | Brandt et al. | 138/113 X |
| 4,220,179 | 9/1980 | Scheffler et al. | 138/113 |

FOREIGN PATENT DOCUMENTS

| 2113597 | 10/1972 | Fed. Rep. of Germany | 174/15 S |
|---|---|---|---|
| 2115670 | 7/1972 | France | 174/15 S |
| 1118570 | 7/1968 | United Kingdom | 174/15 S |
| 1139225 | 1/1969 | United Kingdom | 174/15 S |

*Primary Examiner*—Volodymyr Y. Mayewsky
*Attorney, Agent, or Firm*—Flehr, Hohbach, Test, Albritton & Herbert

[57] ABSTRACT

A cable for cryogenic use includes an inner conductor and a solid polymeric insulator loosely positioned about said inner conductor about 0° C. A collapsible spacer can be positioned between the inner conductor and the polymeric insulator to further space the insulator away from the conductor and thereby accommodate greater shrinkage of the insulator. In fabricating the cable, the cable is sealed and pressure is applied to the cable to expand the insulation. The cable is placed inside a rigid cylinder having an inside diameter larger than the outside diameter of the cable. The cylinder is heated to facilitate expansion of the insulation, and the cylinder is subsequently cooled while maintaining pressure to the cable.

7 Claims, 7 Drawing Figures

U.S. Patent  Jul. 19, 1983  Sheet 1 of 2  4,394,534
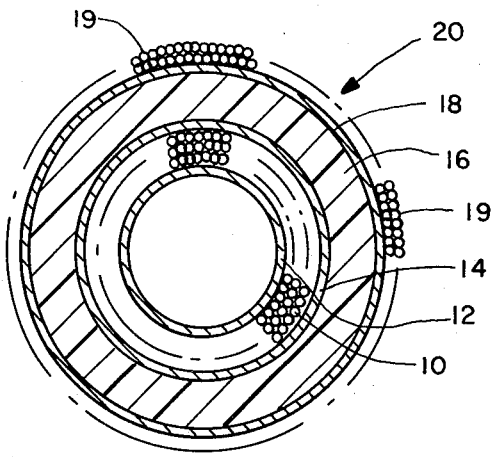
FIG.—1
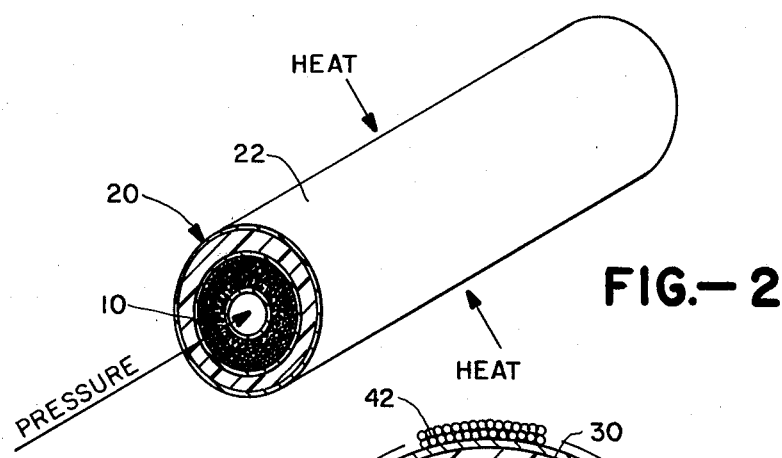
FIG.—2
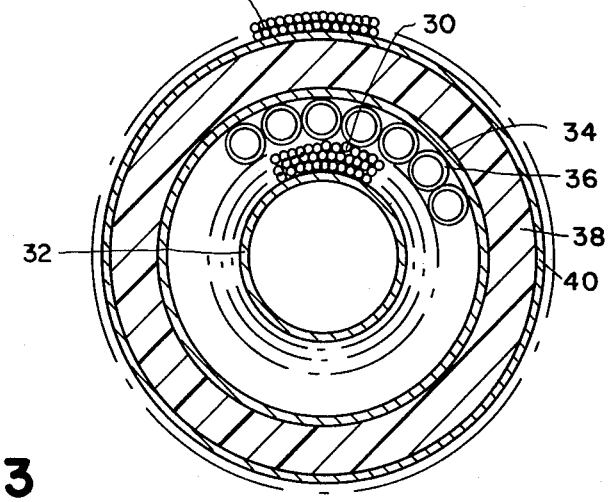
FIG.—3

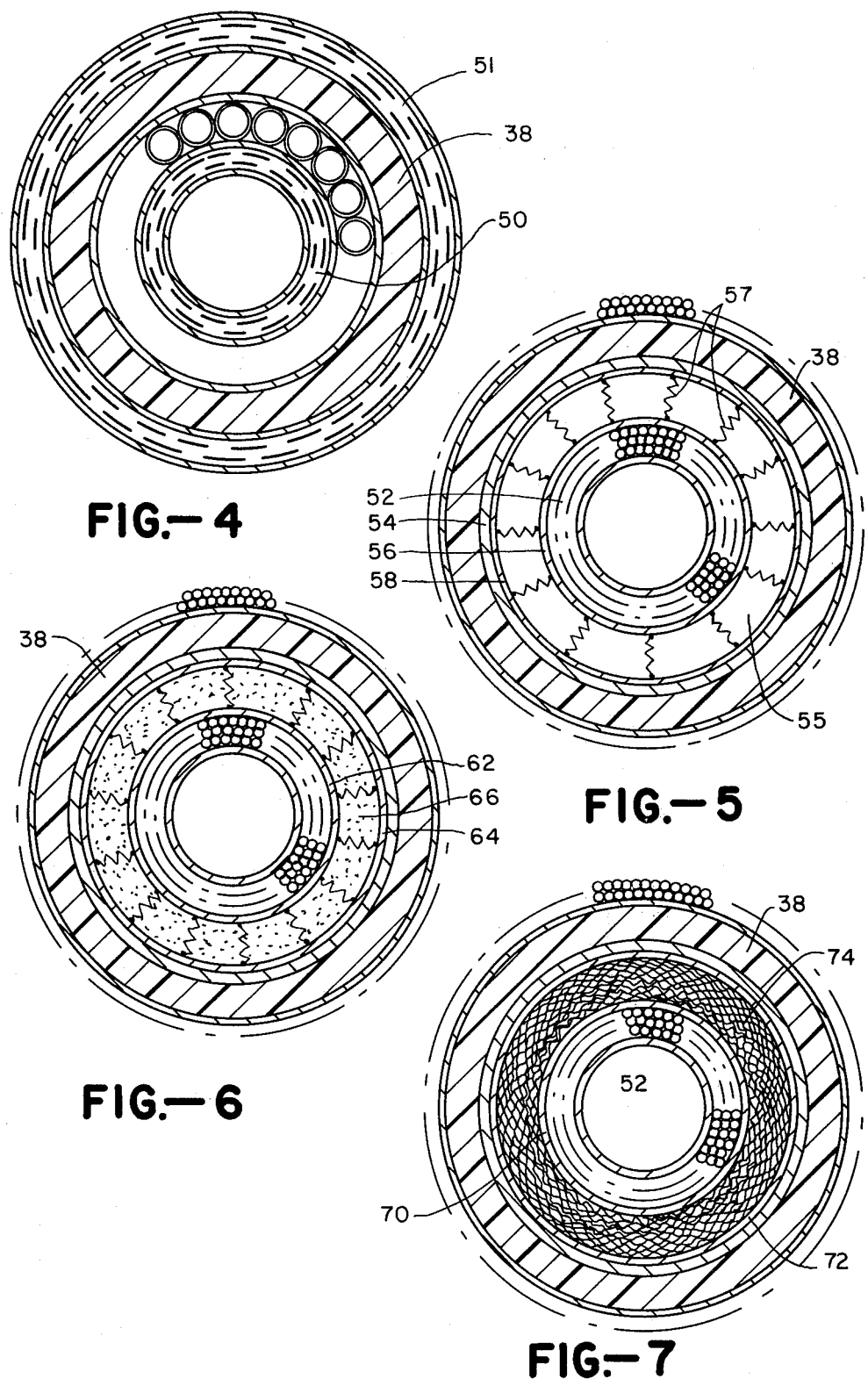

CRYOGENIC CABLE AND METHOD OF MAKING SAME

This invention relates generally to high voltage electrical cables for cryogenic applications, and more particularly the invention relates to cryogenic cables having improved electrical insulation and to the method of manufacturing same.

The use of solid extruded polymeric insulative cables in ambient applications (e.g. at temperatures ranging from −50° C. to +150° C.) has heretofore been proposed. Experimental cables for cryogenic applications have been developed which utilize laminar insulation consisting of cellulose and/or polymeric papers or polymeric films impregnated with liquid nitrogen or helium along the butt-gaps. However, none of these insulation systems has provided the same level of dielectric strength as is obtainable with conventional paper-oil or extruded dielectric at room temperature. The relatively low dielectric strength of such laminar cryogenic cables is caused by the relatively low dielectric strength of the impregnants (nitrogen and especially helium) at temperatures close to their boiling temperatures.

The excellent insulation qualities of solid polymeric material have not been available in cryogenic applications due to difficulties arising from differences in coefficients of thermal expansion of the conductive material and the polymeric material and resulting destructive stresses in the polymeric material at cryogenic temperatures.

Accordingly, an object of the present invention is an improved cryogenic cable.

Another object of the invention is a cryogenic cable having improved electrical insulation.

Still another object of the invention is the method of treating a cable having solid polymeric insulation thereby eliminating the cryogen from the butt-gaps so that the cable can be used in cryogenic applications.

A feature of the invention is polymeric insulation which does not develop damaging stresses from shrinkage when cooled to cryogenic temperatures.

Another feature of the invention is a cryogenic high voltage cable having collapsible means for minimizing insulation stresses arising from shrinkage.

Briefly, a cable in accordance with one embodiment of the invention includes an inner conductor and a polymeric insulator about the conductor. The polymeric insulator is loosely positioned relative to the conductor whereby shrinkage of the insulation at temperatures in the cryogenic operation range does not create excessive stress.

In providing the loose positioning of the insulation about the conductor in the cable, the cable is placed in a rigid cylinder or a pipe which has an inside diameter larger than the outside diameter of the cable. The pipe is heated and internal pressure is applied by means of gas through the stranded or taped conductor to the cable conductor shield and surrounding insulation whereby the conductor shield and insulation expands to the inside diameter of the pipe. The temperature of the pipe is then reduced while maintaining the pressure on the cable, thereby permanently stretching the conductor shield and polymeric insulator.

Although there is now present a void space between the central conductor and the conductor shield, this region is essentially electric field free and should cause no problems. This is because the conductor shield is conducting and the conductor touches it. Since they are at approximately the same potential, there is essentially no electric field between them.

In another embodiment of the invention, the cable can be provided with a plurality of collapsible bodies such as hollow semiconducting tubes which are positioned between the conductor and the conductor shield. In treating the cable for the extrusion process the tubes are first pressurized before pressure is applied to the inner conductor whereby the applied pressure is transmitted to the conductor shield and insulation. Following the extrusion and curing heat treatment and after relieving the applied pressure to the cable, pressure in the tubes is withdrawn.

The invention and objects and features thereof will be more readily apparent from the following detailed description and appended claims when taken with the drawing, in which:

FIG. 1 is a section view of one embodiment of a cryogenic cable in accordance with the present invention.

FIG. 2 is a perspective view illustrating the method of treating a cable in accordance with the invention.

FIGS. 3–7 are section views of other embodiments of a cryogenic cable in accordance with the invention.

Referring now to the drawing, FIG. 1 is a cross section view of an electrical cable in accordance with one embodiment of the present invention. The cable shown generally at 20 includes an inner conductor comprising a plurality of strands 10 of a conductor such as copper which are assembled on a mandrel 12. Surrounding the conductive strands 10 is a conductor shield 14 comprising a material such as carbon impregnated polyethylene. Positioned about the conductor shield 14 is a body of insulation 16, and surrounding insulation 16 is an insulation shield 18 which also may comprise carbon impregnated polyethylene. The outer conductor 19 comprises a plurality of strands of conductive material.

In accordance with the present invention the insulative body 16 comprises a polymeric material such as cross linked polyethelene (XLPE) or ethylene propolene rubber (EPR). Heretofore, such insulation material could be used only in electrical cables operated under ambient conditions. In cryogenic applications the greater coefficient of thermal expansion of the polymeric material compared to the conductor material would cause damaging stresses in the insulation as the cable is cooled down to cryogenic operating temperatures (e.g. 4° K.).

In accordance with the present invention the polyethelene insulation layer is loosely positioned about the inner conductor at ambient temperatures (e.g. above 0° C.). In a low voltage cable requiring only a thin layer of electrical insulation, the insulation material can be extruded loosely over the conductor. A conventional low pressure application technique such as sleeving can be utilized. One or more sleeves of polymeric material can be employed, and intimate bonding of adjacent polymer layers preferably is effected when a plurality of polymer sleeves are utilized. Improved sleeve insulation is provided by using inner and outer semiconductor sleeves and an intermediate dielectric sleeve. The sleeve may be separated or simultaneously applied.

Greater shrinkage of the insulation without inducing damaging stresses therein can be accommodated through a fabrication process wherein the insulation is stretched prior to employment of the cable. Referring to FIG. 2, the assembled cable shown generally at 20 is placed inside of a rigid cylinder 22 and one end of cable 20 is sealed. Thereafter, pressure of the order of two atmospheres or greater is applied through the mandrel 12 of cable 20 with the pressure transmitted through the conductor strands to the conductor shield and surrounding insulation by a relatively inert gas such as argon, neon or nitrogen. Heat on the order of 170° C. is applied to the cable from an external source through cylinder 22 and resulting in the conductor shield, insulation, and insulation shield expanding to contact the inner diameter of cylinder 22. Thereafter, the heat is removed from the assembly while the pressure within cable 20 is maintained thus allowing the insulation to set at a greater radius and spaced further from the inner conductor of the cable. Using the materials described with reference to FIG. 1, pressure should be maintained until the temperature is reduced at least to approximately 85° C. Thereafter, the insulation of the cable will remain expanded beyond the diameter of the conductor without the need for pressure. Consequently, when the cable is cooled for operation at cryogenic temperatures no stress is induced in the insulation system by the conductor even though the insulation system contracts more than the conductor.

For high voltage cables requiring thicker insulation walls, a large radial space must be provided for the change in radial dimension of the insulation. FIG. 3 is a cross section of another embodiment of an electrical cable which provides for increased shrinkage of a thick insulation wall. Again, a plurality of strands of conductor 30 are provided about a mandrel 32. Placed about the strands 30 and inside of the conductor shield 34 are a plurality of collapsible tubes 36 which are impregnated with semiconductor compounds, or covered with a conducting fabric, using materials like Teflon, nylon, polyester or like material which is capable of withstanding the heat treatment described above. The solid polymeric insulation 38 surrounds the conductor shield 34, and an insulator shield 40 surrounds the insulation 38. Strands of the outer conductor 42 surround the shield 40.

The collapsible tubes can be made of semiconductor or insulating material. They may have other than round shape. In the case of insulating tubes they may be covered by a layer of conducting or semiconducting material. The conducting element could be a metallic braid or a fabric with a number of conducting filaments interwoven between insulating filaments or it could be covered by a foil.

In employing the process described above, the ends of tube 36 are closed and the tubes 36 are pressurized prior to the application pressure through mandrel 32 to the table. Preferably, the tube pressure is provided by a liquid such as glycol, glycerol, silicone, or polyalkilene. The pressure within tubes 36 is preferably at least as high as the pressure applied to mandrel 32 whereby the pressure from mandrel 32 is transmitted through tubes 36 to the conductive shield 34, insulation 38, and insulation shield 40. Following the heat treatment and removal of cable pressure as above described, the pressure within tubes 36 is relieved thereby spacing the conductor shield and insulation away from the inner conductor.

FIG. 4 is an alternative embodiment similar to FIG. 3 but in which the inner conductor 50 is a superconductor in the form of two layers of tape, each of which is helically wound in opposite directions. The other components, such as insulator 38, are similar to the components in FIG. 3, except that superconducting tape 51 replaces the outer stranded conductor.

In FIG. 5 the space between the inner conductor binder 52 and the semiconductive shield 54 is occupied by a hollow semiconducting tube 55 having an inner wall 56 and an outer wall 58. The inner wall 56 may be applied directly over the inner conductor 52, and the outer conductor binder 60 is applied over the outer wall 58. During application of the extruded insulation system 38, the tube is filled with a suitable liquid (not shown). Conducting filaments 57 are provided between the two tube walls. After application of the extruded insulation, the liquid is removed from the tube thereby providing space for contraction of the insulation system during cooling of the cable.

FIG. 6 is another embodiment in which the space between the inner conductor binder 62 and an outer binder 64 is occupied by a foam spacer 66 of semiconducting materials or, alternatively, a dielectric provided with conductive filaments to connect the inner and outer binders. In FIG. 7 the space between the inner and outer binders 70, 72 is filled with semiconducting crepe paper 74 which can compress radially during the cooling of the insulation conductor 52 and insulator 38 are like the same elements in FIG. 5.

In still other embodiments the inner and outer conductor binders can be separated by thin longitudinally corrugated spacers made of metal alloy which retains flexing characteristics down to very low temperatures. Further, the inner and outer conductor binders may be joined by a combination of one or more of the described systems, such as for example collapsible tubes and foam.

A cryogenic cable in accordance with the present invention wherein the central conductor is loose with respect to the conductor shield and insulation to accommodate shrinkage thereof for cryogenic operation of the conductor results in a structure having improved insulation since polymeric material can be employed.

While the invention has been described with reference to specific embodiments, the description is illustrative of the invention and is not to be construed as limiting the invention. For example, the plurality of tubes can be replaced by a single double walled tube. Other spacers can be used such as a foam spacer, crepe paper, or longitudinally corrugated spacers. Thus, various modifications and applications may occur to those skilled in the art without departing from the true scope and spirit of the invention as defined by the appended claims.

What is claimed is:

1. A coaxial cryogenic electrical cable comprising an inner electrical conductor, means for cooling said inner conductor, a conductor shield surrounding said inner conductor, a solid polymeric electrical insulator surrounding said inner conductor and conductor shield, an outer conductor surrounding said insulator, and a collapsible spacer means positioned between said inner conductor and said conductor shield.

2. A cryogenic electrical cable, as defined by claim 1 wherein said collapsible spacer means comprises a plurality of hollow tubes.

3. In a cryogenic electrical cable, as defined by claim 1 wherein said collapsible spacer means comprises foam material.

4. A cryogenic electrical cable, as defined by claim 1 wherein said collapsible spacer means comprises conductive crepe paper.

5. A cryogenic electrical cable, as defined by claim 1 wherein said collapsible spacer means comprises a double walled tube.

6. A cryogenic electrical cable, as defined by claim 1 wherein said conductors comprises a plurality of strands of conductive material.

7. A cryogenic electrical cable, as defined by claim 1 wherein said conductors comprises a superconductor tape.

* * * * *